United States Patent
Conte

[11] Patent Number: 6,042,166
[45] Date of Patent: Mar. 28, 2000

[54] GRIPPER

[75] Inventor: Alois Conte, Ebikon, Switzerland

[73] Assignee: Komax Holding AG, Dierikon, Switzerland

[21] Appl. No.: 09/069,873

[22] Filed: Apr. 30, 1998

[30] Foreign Application Priority Data

May 7, 1997 [CH] Switzerland .............. 1075/97

[51] Int. Cl.[7] .................................. B25J 15/00
[52] U.S. Cl. ...................... 294/88; 294/115; 901/37
[58] Field of Search ............... 294/88, 106, 115, 294/116; 901/37

[56] References Cited

U.S. PATENT DOCUMENTS

| | | | |
|---|---|---|---|
| 3,717,000 | 2/1973 | Rothwell, Jr. ............... | 294/115 |
| 4,368,913 | 1/1983 | Brockmann et al. .......... | 294/106 |
| 4,463,635 | 8/1984 | Hafla et al. ................. | 294/116 |
| 4,576,407 | 3/1986 | Lambert ...................... | 294/88 |
| 4,650,236 | 3/1987 | Haney et al. ................ | 294/116 |
| 4,728,137 | 3/1988 | Hamed et al. . | |
| 5,280,981 | 1/1994 | Schulz ....................... | 901/38 |
| 5,284,375 | 2/1994 | Land, III ..................... | 294/88 |

FOREIGN PATENT DOCUMENTS

| | | | |
|---|---|---|---|
| 1397958 | 3/1965 | France . | |
| 29701719 | 4/1997 | Germany ............. | B23Q 3/155 |
| 908864 | 10/1962 | United Kingdom . | |

*Primary Examiner*—Dean J. Kramer
*Assistant Examiner*—Paul T. Chin
*Attorney, Agent, or Firm*—Pillsbury Madison & Sutro

[57] ABSTRACT

The gripper is provided with two gripper jaws, actuatable pneumatically or hydraulically via a piston guided and sealed in a cylinder, the piston being hinged to the gripper jaws via a lever transmission in order to drive them. In order to obtain a construction which is as compact as possible, the gripper jaws are each provided at the ends with a single-armed lever and the piston is hinged via a piston rod to a coupling point each between the gripper jaw and the pivot of each single-armed lever.

20 Claims, 6 Drawing Sheets

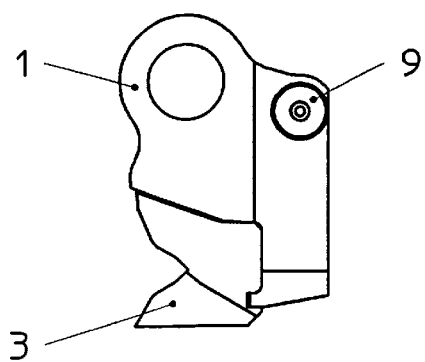
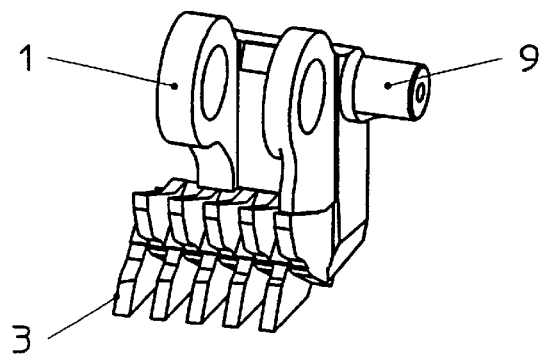
Fig.18       Fig.19
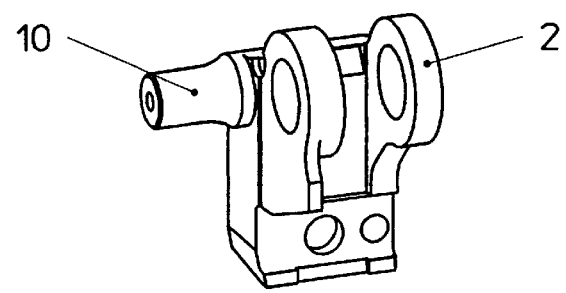
Fig.20

GRIPPER

BACKGROUND OF THE INVENTION

The invention relates to a gripper, in particular a cable gripper with two gripper jaws actuable pneumatically or hydraulically by a piston guided and sealed in a cylinder, where the piston, in order to drive the gripper jaws, is hinged to them via a lever transmission.

Grippers of the type named in the introduction are already known, however they have the disadvantage that, in order to achieve a wider aperture angle of the gripper levers or gripper arms, for example, of 150° and more, a relatively large constructional height of the gripper is necessary which in turn results in a relatively great mass of the latter. If the gripper is to be arranged on a swivel arm, for example in robotics, then a gripper is desired which is as compact as possible in order to obtain the lowest possible energy requirement to drive the swivel arm and to carry out a precise, swivel movement of the latter as rapidly as possible.

SUMMARY OF THE INVENTION

The objective of the present invention is to create a gripper which does not have the previously described disadvantages of the grippers known up to now, i.e. which is extremely light and compact, despite the gripper lever or gripper arms having a wide aperture angle.

This objective is achieved according to the invention with a gripper of the type described in the introduction, in that the gripper jaws are each provided with a single-armed lever at their ends and the piston is hinged via a piston rod to a coupling point, each coupling point being located between each gripper jaw and the pivot of each single-armed lever, in that the piston rod is provided at its end area remote from the piston, with a guide slot which extends perpendicular to its longitudinal axis for the displaceably guided reception of the coupling pins which form the coupling point of the two single-armed levers, and in that the two single-armed levers, viewed in the direction of the longitudinal axis of the piston rod, are arranged next to and laterally offset from the latter so as to be swivellable.

It is advantageous if the rotational axes which run through the pivots of the two single-armed levers coincide.

In order to achieve a unit which is compact as possible, it is also advantageous if the piston rod is connected rigidly at its one end-face with the piston and is sealed in its longitudinal direction and displaceably guided without lateral clearance. In addition, it is purposeful if the piston rod is provided with a guide slot for the displaceably guided reception of the coupling pins which are equipped with tenon blocks and form the coupling point of the two single-armed levers.

It is also advantageous if the piston rod, viewed in the direction of its longitudinal axis, has an oblong cross-section which, at least in the area of the guide slot, has a breadth corresponding at least to the length of the guide slot and a height corresponding to at least 130% of the guide-slot depth.

In order to achieve a constructional height which is as small as possible, it is advantageous if the piston rod, on its side remote from the piston, is provided with a recess which runs perpendicular to the guide slot, is centrally arranged and extends, in the longitudinal direction of the piston rod, from the end-face of the piston rod remote from the piston towards the piston, the recess being for the unobstructed free passage of at least one swivel axis serving to support the two single-armed levers in a swivellable manner.

In order to achieve a constructional breadth which is as small as possible, it is also purposeful if the two single-armed levers are offset against each other in the gripping direction.

Furthermore, for many applications it is advantageous if the stroke of the piston is dimensioned in such a way, that the swivelling range of each lever arm is at least 75°, and the gripper jaws are formed as cable gripper elements.

BRIEF DESCRIPTION OF THE DRAWINGS

The invention is described below using drawings by means of example, which show:

FIG. 18: A side view of the one lever arm, without the gripper jaw to be attached to it;

FIG. 19: A perspective view of the lever arm shown in FIG. 18, and;

FIG. 20: Similarly to FIG. 19, a perspective view of the second lever arm without the gripper jaw to be attached to it.

DETAILED DESCRIPTION OF THE PREFERRED EMBODIMENTS

The invention is described in greater detail below with the aid of an embodiment by way of example of a pneumatically actuated cable gripper for use in a cable-working machine, for centrally clamping a cable to be worked between two gripper jaws formed in a known way.

Figure 1:
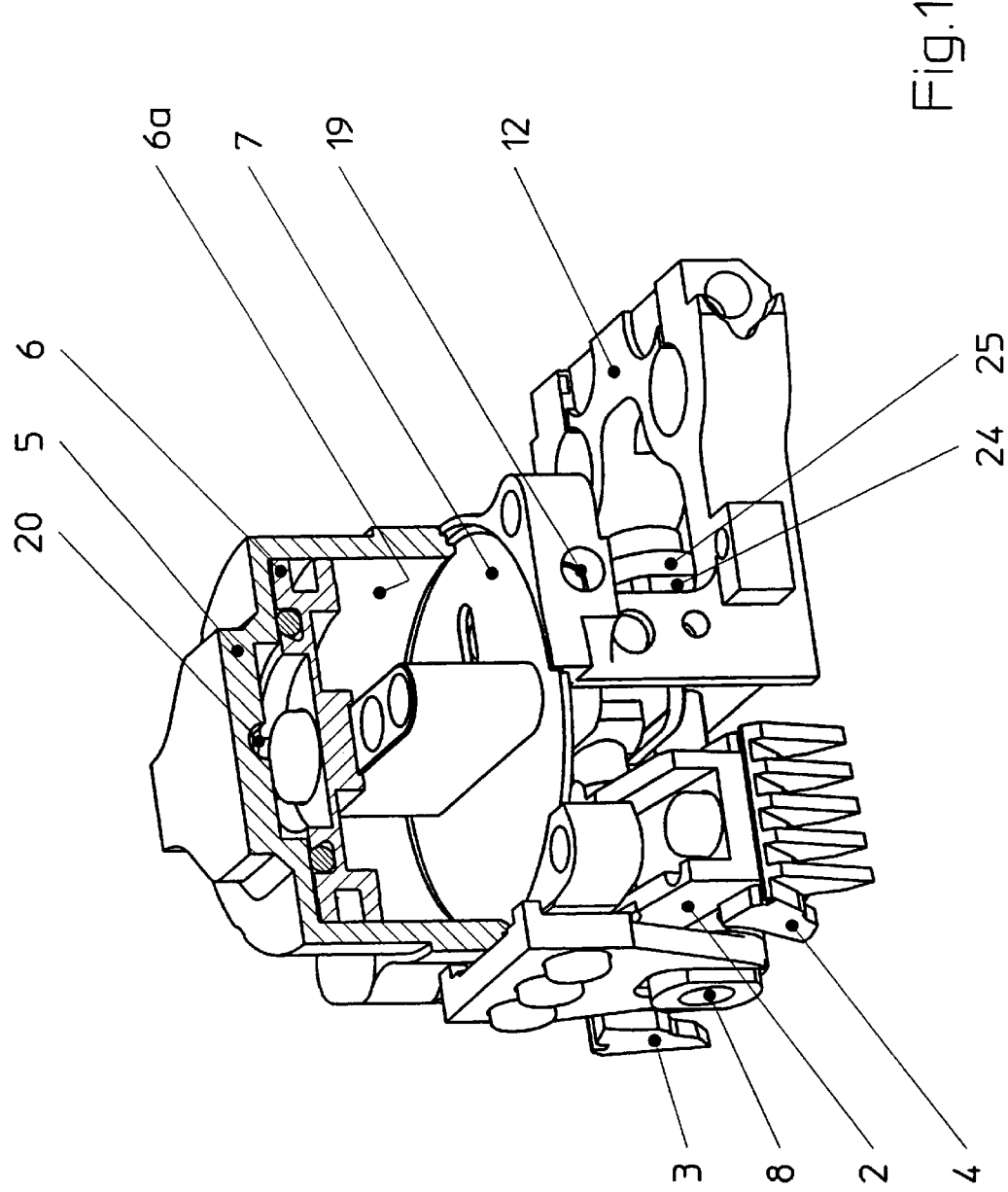
FIG. 1: In enlarged scale, a perspective view of a example of an embodiment of a gripper, partially in section.
Figure 2:
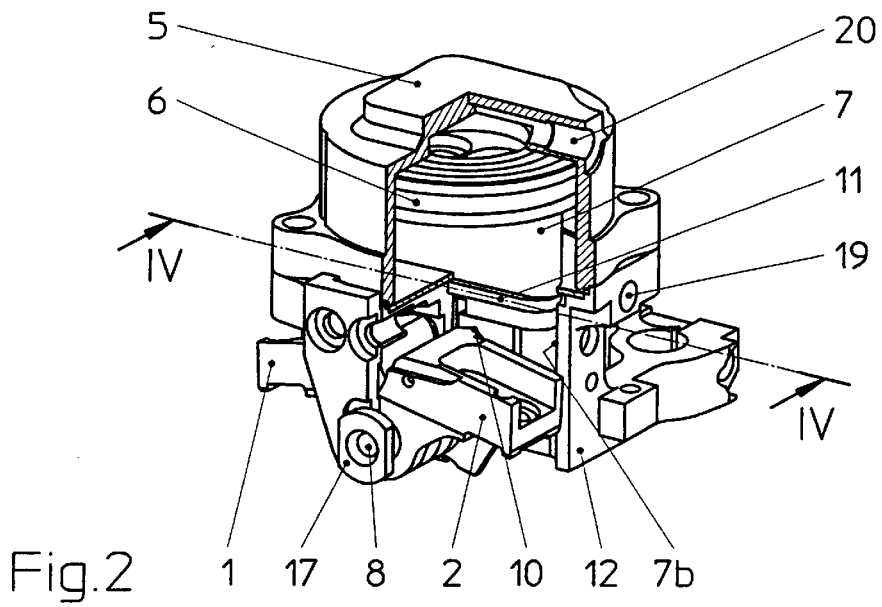
FIG. 2: A perspective view similar to FIG. 1, however from a different view point and, in order to obtain a better overall view, without the clamping jaws attached to the lever arms.

For better clarity of the various drawings, except for in FIG. 1, the gripper jaws formed in a known way as centering and clamping jaws 3 and 4 to be fixed onto the two levers or lever arms 1 and 2, are not drawn in.

The gripper jaws 3 and 4 could of course also be directly formed onto the relevant lever arms 1 and 2 and formed in any other way required in robotics.

A piston 6, guided in a cylinder so as to be sealed and displaceable in its longitudinal axis, serves for the pneumatic operation of the two lever arms 1 and 2 which piston is hinged with each coupling pin 9 or 10 formed in a pin-shape, via a piston rod 7 connected rigidly to it (see e.g. FIG. 4 and 5), the coupling point being located between the gripper jaw 3 or 4 and the common pivot 8 of each of the two single-armed lever arms 1 or 2.

The piston rod 7 is sealed in its longitudinal direction by means of an annular seal 11, and displaceably guided without lateral clearance in a corresponding recess 7b in the gripper base body 12. In this way, via the piston rod 7 connected rigidly to it, the piston is guided so as to be centrically opposite the cylinder barrel 6a over the entire stroke area.

Figure 3:
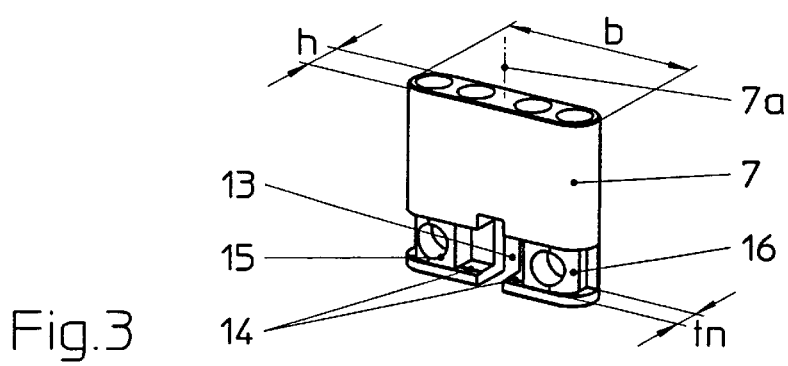
FIG. 3: A perspective view of the piston rod with tenon blocks which are laterally displaceable in its guide slot.
Figure 7:
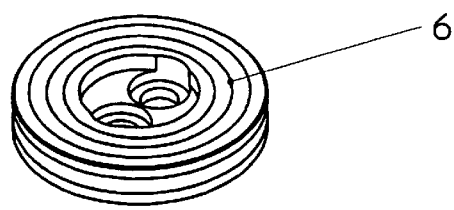

As can be seen for example from FIGS. 3 and 7, the piston rod is provided 7 at its end area remote from the piston 6, with a guide slot 14 which extends perpendicular to the longitudinal axis 7a of the piston rod, and is interrupted by a recess 13, which guide slot is for the displaceably guided reception, without clearance, of the coupling pins 9 or 10 equipped with tenon blocks 15 or 16. The piston rod 7, to prevent it from rotating around its longitudinal axis 7a has, viewed in the longitudinal direction of the latter, an oblong cross-section which has a breadth b corresponding to the required length of the guide slot, and for stability reasons has a height h corresponding to approximately 170% of the guide-slot depth.

Figures 4, 5:
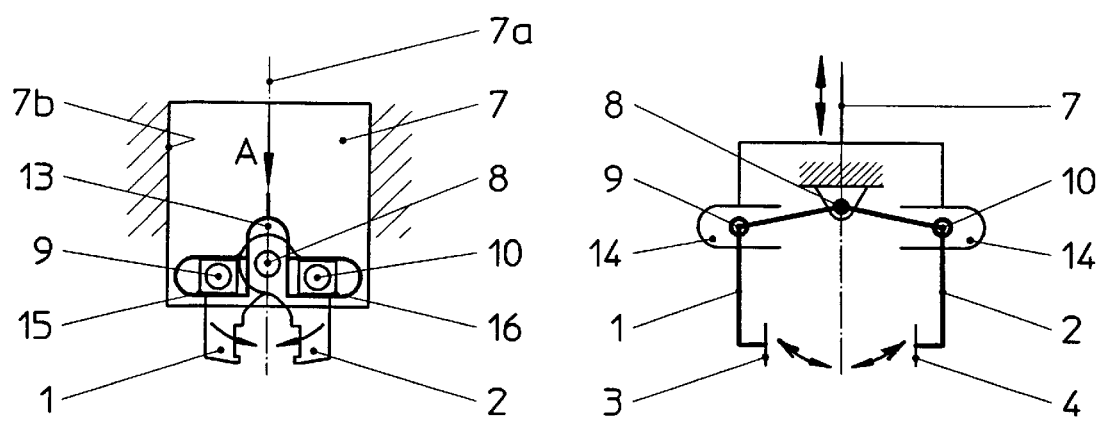
FIG. 4: A section along the line IV—IV in FIG. 2 to illustrate the kinematics of the lever transmission of the gripper according to FIGS. 1 and 2.
FIG. 5: Purely diagrammatic, the kinematics of the lever transmission according to FIG. 4.
Figure 6:
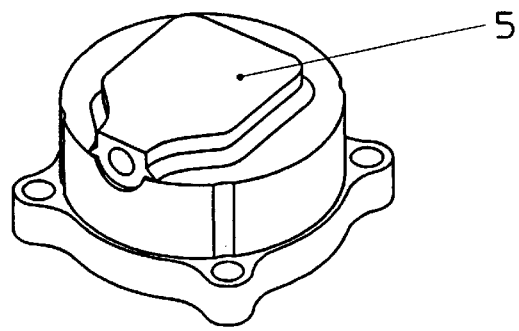
FIGS. 6 to 11: Various details of the gripper in perspective view according to FIGS. 1 and 2.
Figures 8, 9, 10:
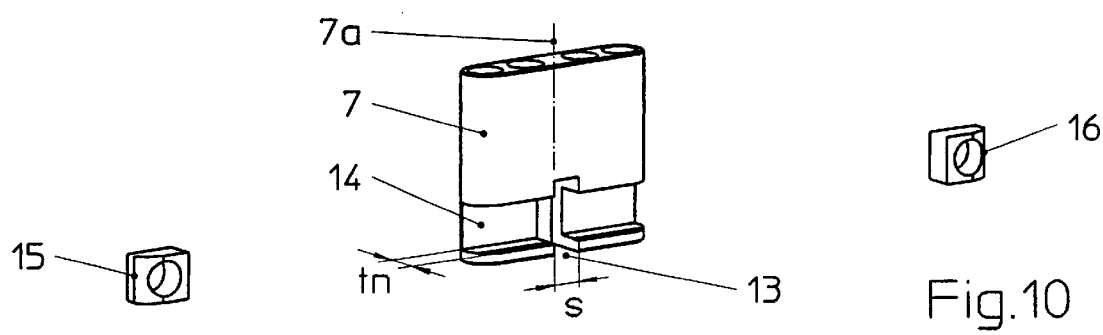
Figure 11:
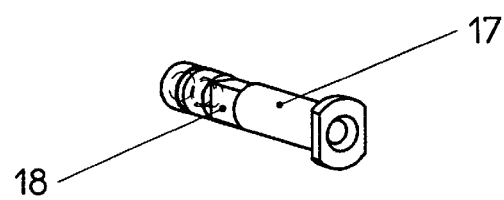

As can be seen from FIG. 4, for example, the recess 13 in the piston rod 7 enables a displacement of the guide slot 14 in the direction of the arrow A past the pivot 8. The pivot 8 is formed by the axle 17 which can be seen especially from FIG. 11, which axle in its area 18 is laterally flattened to a smaller breadth than the breadth s (see FIG. 8) of the recess 13, in order to allow an unobstructed displacement of the piston rod 7 over this axle 17.

In order to bring the two cable centering and cable clamping jaws 3 and 4 into engagement in a known way, the two single-armed levers 1 and 2, as can be seen particularly from the FIGS. 12 to 14 and 18 to 20, are offset against each other in gripping direction B in the area of the coupling point 9 or 10.

In order to obtain a construction of the cable gripper which is as compact as possible, as can be seen particularly from the FIGS. 1, 2 and 12 to 14, viewed in the direction A of the longitudinal axis 7a of the piston rod 7, the two single-armed levers are also laterally offset against each other and arranged laterally next to the piston rod 7 so as to be swivellable on the rotational axis 17. The coupling pin 10 of the lever arm 2 which is further away from the piston rod 7 and arranged so as to be laterally offset, is longer for the lateral offset than the coupling pin 9 of the lever arm 1 nearer the piston rod 7, supported so as to be swivellable, so that both coupling pins 9 and 10 engage with a sliding fit equally far into the relevant tenon blocks 15 or 16.

Figure 12:
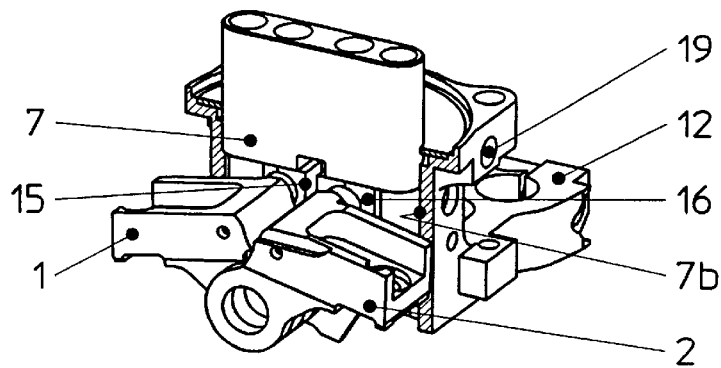
FIGS. 12 to 14: In perspective view, partially in section, a part of the gripper according to FIGS. 1 to 11 in three different positions of the piston rod or of the lever arms moved by this latter.
Figure 13:
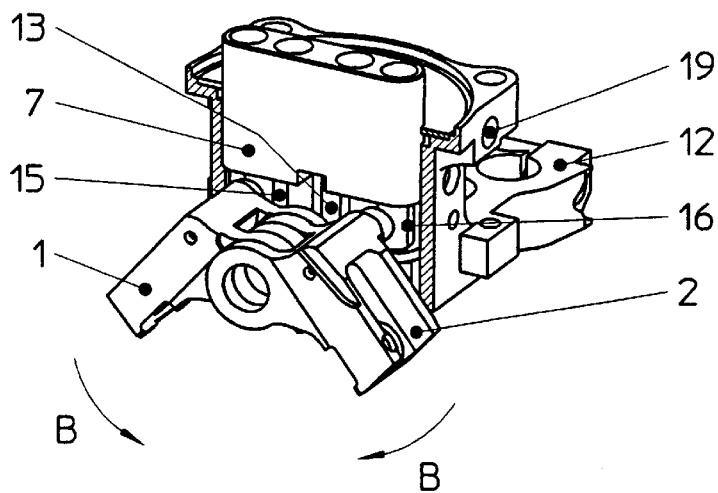
Figure 14:
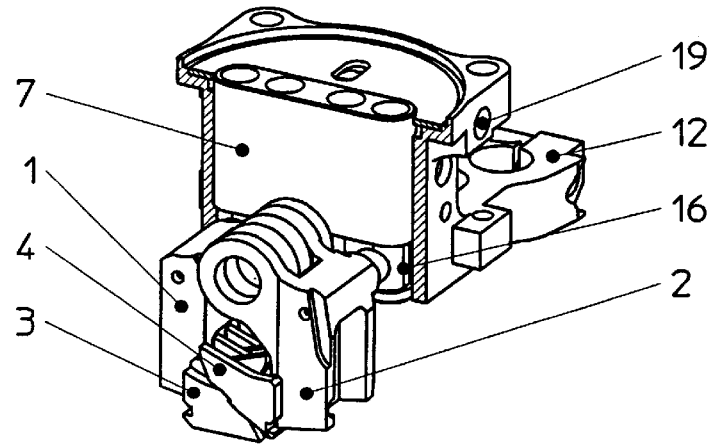

The different phases of the gripper kinematics when closing the gripper can be seen from FIGS. 12 to 14.

For the pneumatic actuation of the piston 6, depending on the direction of movement of the piston 6 to be achieved, the compressed air is supplied via the connection points 19 or 20 which in relation to the piston are mutually connected with the interior of the cylinder housing 5.

Figure 15:
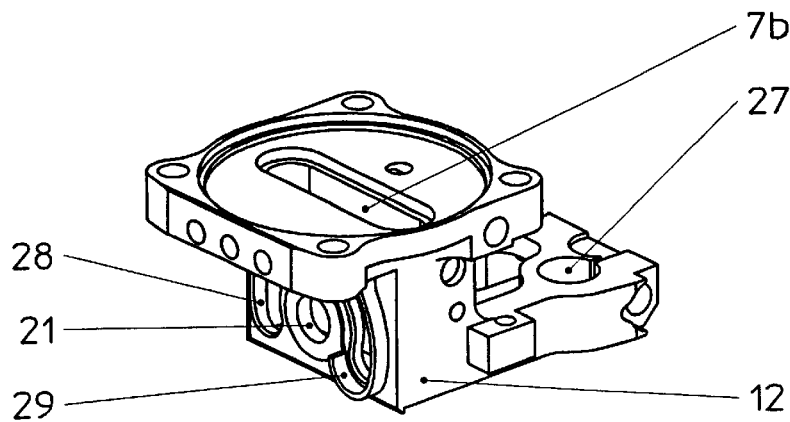
FIGS. 15 to 17: Various perspective views of the base body of the gripper.
Figure 16:
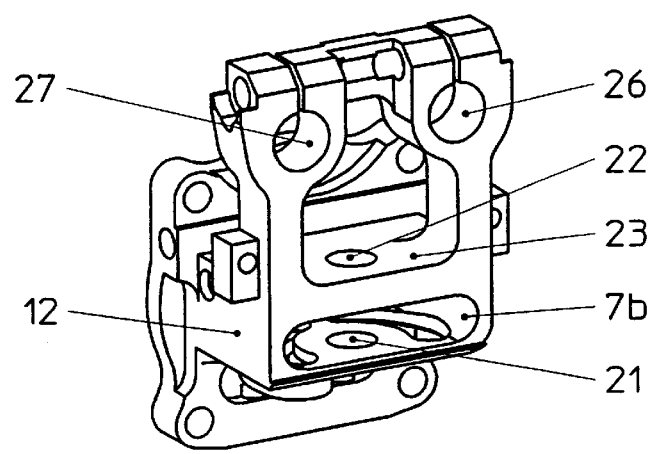
Figure 17:
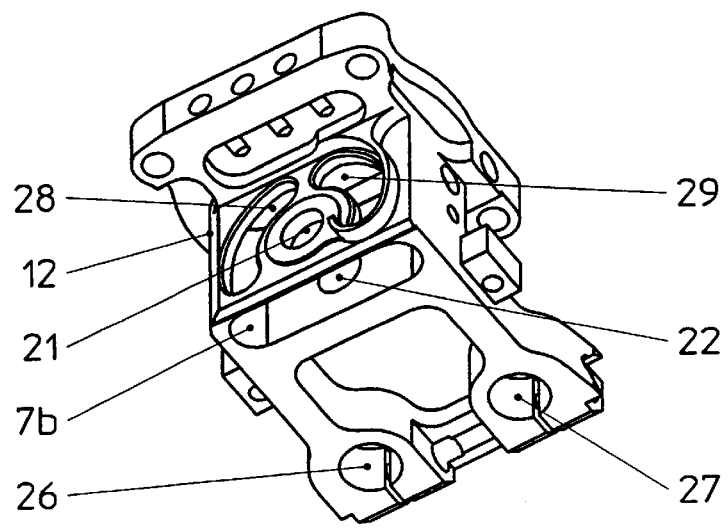

The axle 17 for the swivellable support of the two lever arms 1 and 2, for its attachment in the gripper base body 12, extends with a sliding fit through the two bores 21 and 22 which can be seen from the FIGS. 15 to 17, and is fixed in its position on the outer side 23 remote from the piston rod 7 of the bore 22 by means of two locking nuts 24 and 25.

The two bores 26 and 27 in the gripper base body 12 serve e.g. to attach the gripper to a robot arm which is not shown. The two coupling pins 9 and 10 of the two lever arms 1 and 2 engage through arc-shaped openings 28 and 29 provided in the gripper base body 12 (see FIG. 17), into the tenon blocks 15 and 16 which are guided in the piston rod 7 so as to be laterally displaceable. The two openings 28 and 29 are dimensioned in such a way that the swivel movement of the two coupling pins 9 and 10 over the entire stroke of the piston rod 7 is not obstructed by parts of the gripper base body 12.

In a gripper of the embodiment shown, an aperture angle of 150° and more measured between the two lever arms 1 and 2, can easily be realised.

What is claimed is:

1. A gripper with two gripper jaws actuatable pneumatically or hydraulically by a piston guided and sealed in a cylinder, where the piston, in order to drive the gripper jaws, is hinged to the gripper jaws via a lever transmission, characterized in that the gripper jaws are each provided with a respective single-armed lever at their ends, and the piston is hinged via a piston rod to a coupling point, each coupling point being located between each gripper jaw and the pivot of each single-armed lever, in that the piston rod is provided at its end area remote from the piston, with a guide slot which extends perpendicular to its longitudinal axis and is for the displaceably guided reception of coupling pins which form the coupling point of the two single-armed levers, and in that the two single-armed levers, viewed in the direction of the longitudinal axis of the piston rod, are arranged laterally offset next to the latter so as to be swivellable and the pivots of the two single-armed levers have a common pivot axis.

2. A gripper according to claim 1, characterized in that the two single-armed levers are offset against each other in the gripping direction.

3. A gripper according to claim 1, characterized in that the stroke of the piston is dimensioned in such a way that the swivelling range of each lever arm is at least 75°.

4. A gripper according to claim 1, characterized in that the gripper jaws are formed as cable gripper elements.

5. A gripper with two gripper jaws actuatable pneumatically or hydraulically by a piston guided and sealed in a cylinder, where the piston, in order to drive the gripper jaws, is hinged to the gripper jaws via a lever transmission, characterized in that the gripper jaws are each provided with a respective single-armed lever at their ends, and the piston is hinged via a piston rod to a coupling point, each coupling point being located between each gripper jaw and the pivot of each single-armed lever, in that the piston rod is provided at its end area remote from the piston, with a guide slot which extends perpendicular to its longitudinal axis and is for the displaceably guided reception of coupling pins which form the coupling point of the two single-armed levers, and in that the two single-armed levers, viewed in the direction of the longitudinal axis of the piston rod, are arranged laterally offset next to the latter so as to be swivellable, and further characterized in that the piston rod is connected rigidly to the piston at its one end-face and is sealed in its longitudinal direction and displaceably guided without lateral clearance.

6. A gripper according to claim 5, characterized in that the two single-armed levers are offset against each other in the gripping direction.

7. A gripper according to claim 5, characterized in that the stroke of the piston is dimensioned in such a way that the swiveling range of each lever arm is at least 75°.

8. A gripper according to claim 5, characterized in that the gripper jaws are formed as cable gripper elements.

9. A gripper with two gripper jaws actuatable pneumatically or hydraulically by a piston guided and sealed in a cylinder, where the piston, in order to drive the gripper jaws, is hinged to the gripper jaws via a lever transmission, characterized in that the gripper jaws are each provided with a respective single-armed lever at their ends, and the piston is hinged via a piston rod to a coupling point, each coupling point being located between each gripper jaw and the pivot of each single-armed lever, in that the piston rod is provided at its end area remote from the piston, with a guide slot which extends perpendicular to its longitudinal axis and is for the displaceably guided reception of coupling pins which form the coupling point of the two single-armed levers, and in that the two single-armed levers, viewed in the direction of the longitudinal axis of the piston rod, are arranged laterally offset next to the latter so as to be swivellable, and further characterized in that the piston rod is provided with a guide slot for the displaceably guided reception of the coupling pins which are equipped with tenon blocks and form the coupling point of the two single-armed levers.

10. A gripper according to claim 9, characterized in that the two single-armed levers are offset against each other in the gripping direction.

11. A gripper according to claim 9, characterized in that the stroke of the piston is dimensioned in such a way that the swiveling range of each lever arm is at least 75°.

12. A gripper according to claim 9, characterized in that the gripper jaws are formed as cable gripper elements.

13. A gripper with two gripper jaws actuatable pneumatically or hydraulically by a piston guided and sealed in a cylinder, where the piston, in order to drive the gripper jaws, is hinged to the gripper jaws via a lever transmission, characterized in that the gripper jaws are each provided with a respective single-armed lever at their ends, and the piston is hinged via a piston rod to a coupling point, each coupling point being located between each gripper jaw and the pivot of each single-armed lever, in that the piston rod is provided at its end area remote from the piston, with a guide slot which extends perpendicular to its longitudinal axis and is for the displaceably guided reception of coupling pins which form the coupling point of the two single-armed levers, and in that the two single-armed levers, viewed in the direction of the longitudinal axis of the piston rod, are arranged laterally offset next to the latter so as to be swivellable, and further characterized in that the piston rod, viewed in the direction of its longitudinal axis, has an oblong cross-section which, at least in the area of the guide slot, has a breadth corresponding at least to the length of the guide slot, and a height corresponding to at least 130% of the guide-slot depth.

14. A gripper according to claim 13, characterized in that the two single-armed levers are offset against each other in the gripping direction.

15. A gripper according to claim 13, characterized in that the stroke of the piston is dimensioned in such a way that the swiveling range of each lever arm is at least 75°.

16. A gripper according to claim 13, characterized in that the gripper jaws are formed as cable gripper elements.

17. A gripper with two gripper jaws actuatable pneumatically or hydraulically by a piston guided and sealed in a cylinder, where the piston, in order to drive the gripper jaws, is hinged to the gripper jaws via a lever transmission, characterized in that the gripper jaws are each provided with a respective single-armed lever at their ends, and the piston is hinged via a piston rod to a coupling point, each coupling point being located between each gripper jaw and the pivot of each single-armed lever, in that the piston rod is provided at its end area remote from the piston, with a guide slot which extends perpendicular to its longitudinal axis and is for the displaceably guided reception of coupling pins which form the coupling point of the two single-armed levers, and in that the two single-armed levers, viewed in the direction of the longitudinal axis of the piston rod, are arranged laterally offset next to the latter so as to be swivellable, and further characterized in that the piston rod, on its side remote from the piston, is provided with a recess which runs perpendicular to the guide slot, is arranged centrally and extends, in the longitudinal direction of the piston rod, from the end of the piston rod remote from the piston towards the piston, the recess being for the unobstructed free passage of at least one swivel axle serving to support the two single-armed levers in a swivellable manner.

18. A gripper according to claim 17, characterized in that the two single-armed levers are offset against each other in the gripping direction.

19. A gripper according to claim 17, characterized in that the stroke of the piston is dimensioned in such a way that the swiveling range of each lever arm is at least 75°.

20. A gripper according to claim 17, characterized in that the gripper jaws are formed as cable gripper elements.

\* \* \* \* \*